United States Patent
Lynch

(10) Patent No.: US 8,553,942 B2
(45) Date of Patent: Oct. 8, 2013

(54) REIMAGING BASED ON DEPTHMAP INFORMATION

(75) Inventor: James D. Lynch, Chicago, IL (US)

(73) Assignee: Navteq B.V., Veldhoven (NL)

( * ) Notice: Subject to any disclaimer, the term of this patent is extended or adjusted under 35 U.S.C. 154(b) by 60 days.

(21) Appl. No.: 13/278,499

(22) Filed: Oct. 21, 2011

(65) Prior Publication Data

US 2013/0101175 A1  Apr. 25, 2013

(51) Int. Cl.
*G06K 9/00* (2006.01)
(52) U.S. Cl.
USPC .......................................................... 382/106
(58) Field of Classification Search
USPC ................................................. 382/106, 154
See application file for complete search history.

(56) References Cited

U.S. PATENT DOCUMENTS

| | | | |
|---|---|---|---|
| 6,374,182 B2 | 4/2002 | Bechtolsheim et al. | |
| 6,507,665 B1 * | 1/2003 | Cahill et al. | 382/154 |
| 6,552,744 B2 * | 4/2003 | Chen | 348/218.1 |
| 7,460,953 B2 | 12/2008 | Herbst et al. | |
| 7,626,596 B2 * | 12/2009 | Kotake et al. | 345/632 |
| 2004/0169724 A1 * | 9/2004 | Ekpar | 348/36 |
| 2006/0002590 A1 | 1/2006 | Borak | |
| 2006/0072848 A1 * | 4/2006 | Razzano | 382/284 |
| 2007/0237424 A1 | 10/2007 | Burg et al. | |
| 2009/0292457 A1 | 11/2009 | Ford et al. | |
| 2010/0023250 A1 | 1/2010 | Mays et al. | |
| 2010/0299065 A1 | 11/2010 | Mays | |
| 2010/0305854 A1 | 12/2010 | Kammel et al. | |
| 2011/0109617 A1 | 5/2011 | Snook et al. | |
| 2011/0109618 A1 | 5/2011 | Nowak et al. | |
| 2011/0141141 A1 | 6/2011 | Kankainen | |
| 2011/0279452 A1 | 11/2011 | Ibe et al. | |
| 2011/0283223 A1 | 11/2011 | Vaittinen et al. | |
| 2011/0313653 A1 | 12/2011 | Lindner | |

FOREIGN PATENT DOCUMENTS

| | | |
|---|---|---|
| EP | 1584897 A2 | 10/2005 |
| EP | 2 309 463 | 4/2011 |
| WO | WO2009131276 A1 | 10/2009 |
| WO | WO 2010/012310 | 2/2010 |

OTHER PUBLICATIONS

U.S. Appl. No. 13/332,718, filed Dec. 21, 2011, Lynch.
U.S. Appl. No. 13/341,152, filed Dec. 30, 2011, Lynch.
U.S. Appl. No. 13/340,923, filed Dec. 30, 2011, Lynch.

(Continued)

*Primary Examiner* — Tom Y Lu
(74) *Attorney, Agent, or Firm* — Lempia Summerfield Katz LLC

(57) ABSTRACT

One or more systems, devices, and/or methods for emphasizing objects in an image, such as a panoramic image, are disclosed. For example, a method includes receiving a depthmap generated from an optical distancing system, wherein the depthmap includes position data and depth data for each of a plurality of points. The optical distancing system measures physical data. The depthmap is overlaid on the panoramic image according to the position data. Data is received that indicates a location on the panoramic image and, accordingly, a first point of the plurality of points that is associated with the location. The depth data of the first point is compared to depth data of surrounding points to identify an area on the panoramic image corresponding to a subset of the surrounding points. The panoramic image is altered with a graphical effect that indicates the location.

20 Claims, 16 Drawing Sheets

(56) References Cited

OTHER PUBLICATIONS

Ding, Ming, et al., "Automatic registration of aerial imagery with untextured 3D LiDAR models," University of California Berkeley, 8 pages.
Inpainting, http://iat.ubalt.edu/summers/math/inpainting.htm (viewed on Nov. 30, 2011).
Kopf, Johannes, et al., "Street Slide: Browsing Street Level Imagery," Microsoft Research, 8 pages.
International Search Report and Written Opinion cited in PCT/EP2012/070526, mailed on Jan. 18, 2013.
U.S. Appl. No. 13/278,512, filed Oct. 21, 2011, Lynch.
U.S. Appl. No. 13/278,546, filed Oct. 21, 2011, Lynch.
"Google Maps Navigation for mobile." http://www.google.com/mobile/navigation/. 2 pages (viewed on Oct. 19, 2011).
David Gallup et al., "Piecewise Planar and Non-planar Stereo for Urban Scene Reconstruction", Jun. 13, 2010, pp. 1418-1425, 2010 IEEE Conference on Computer Vision and Pattern Recognition.
International Search Report and Written Opinion, from related International Application No. PCT/EP2012/070438, Apr. 17, 2013.
International Search Report and Written Opinion, from related International Application No. PCT/EP2012/075022, Apr. 15, 2013.
Stephen Shankland, "Google Gathers 3D Data with Street View", May 15, 2008, retreived from the internet: URL: http://news.cnet.com/8301-10784_3-9945.
International Search Report and Written Opinion cited in PCT/EP2012/069812, mailed on Mar. 6, 2013.
Kawakita, et al., "Real-Time Three-Dimensional Video Image Composition by Depth Information", IEICE Electronics Press, vol. 1, No. 9, Aug. 10, 2004.
International Search Report and Written Opinion from PCT/EP2012/074881, Apr. 8, 2013.

* cited by examiner

150

US 8,553,942 B2

REIMAGING BASED ON DEPTHMAP INFORMATION

REFERENCE TO RELATED APPLICATIONS

The present patent application is related to the copending patent applications filed on the same date, Ser. No. 13/278,512, entitled "DEPTH CURSOR AND DEPTH MEASUREMENT IN IMAGES," and Ser. No. 13/278,546, entitled "THREE DIMENSIONAL ROUTING,", the entire disclosures of which are incorporated by reference herein.

BACKGROUND OF THE INVENTION

The present invention relates to maps and/or navigation and, more particularly, to method(s) and system(s) for reimaging images, such as panoramic, street level view, or high-altitude view images, in a map application or a navigation application.

Navigation applications may be installed in vehicles to provide images to passengers or in portable (e.g., handheld) devices such as phones, personal digital assistants, or personal navigation devices. The navigation application may provide images that aid the user in determining current position and guiding the user to a destination. In addition the images provide information such as points of interest to the user. Alternatively, map applications, which may be stationary or portable, provide users with similar services from a website or other service without regard to the current position of the user.

In some situations, the user may select an object or specific area of the images to choose a route or request additional information about the object or location. Because navigation or map systems typically involve a two-dimensional (2D) representation of a three-dimensional (3D) image, when an object is selected, distinction between whether the object is a foreground image or a background image is often difficult.

SUMMARY OF THE INVENTION

According to one aspect, one or more systems, devices, and/or methods for emphasizing objects in an image, such as a panoramic image, are disclosed. For example, a method includes receiving a depthmap generated from an optical distancing system, wherein the depthmap includes depth data for each of a plurality of points, and overlaying the depthmap on the panoramic image according to the plurality of points. Data indicative of a location on the panoramic image and indicative of a first point of the plurality of points is received. The depth data of the first point is compared to depth data of surrounding points to identify an area on the panoramic image corresponding to a subset of the surrounding points. The panoramic image is altered with a graphical effect at one or more of the surrounding points.

The present invention is defined by the following claims, and nothing in this section should be taken as a limitation on those claims. Further aspects and advantages of the invention are discussed below in conjunction with the preferred embodiments.

DETAILED DESCRIPTION OF THE PRESENTLY PREFERRED EMBODIMENTS

Figure 1:
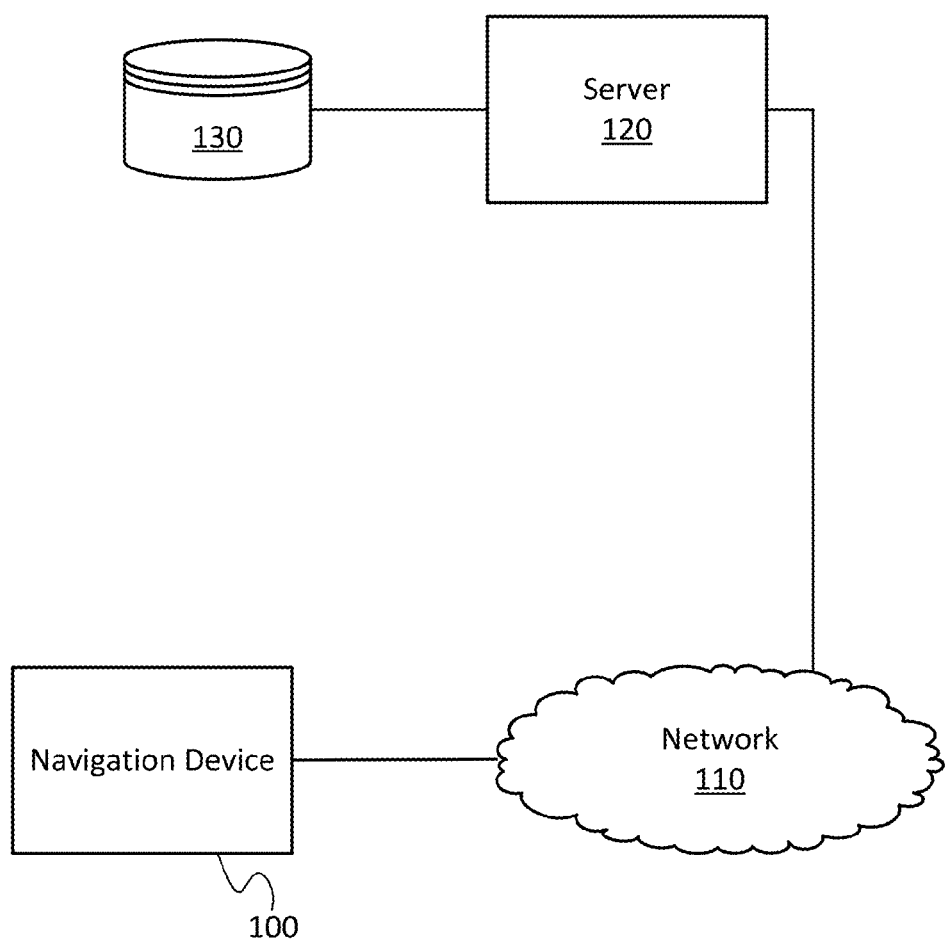
FIG. 1 illustrates an example embodiment of a navigation system or map system.

Map systems or navigation systems provide users with panoramic images, street level view images, or high-altitude images (e.g., satellite, airplane) for navigation related features or map related features. Navigation related features include determining an optimum route and providing directions (e.g., exit cues or turn cues) to travel along a path from an original location to a destination location. The path may be a road network, a pedestrian pathway network, or an indoor walkway network. Navigation related features may be provided by mobile devices. Map related features, or features without a navigational or guidance component, may be provided by mobile devices or stationary devices. Map related features include locating nearby points of interest or directions between two positions without regard to current location. Each of the embodiments described herein may be configured to provide navigation related features, map related features, or both.

Map related features and navigation related features may involve reimaging the image. Reimaging includes emphasizing, de-emphasizing, isolating, highlighting, accentuating, or focusing a region or object in the image. For example, the destination location may be emphasized to illustrate the destination location to the user. In addition, the user may select an object or location in the image through touching, clicking, or hovering (e.g., mousing) above the image. The selection or attempted selection is illustrated to the user.

In a 2D image, the map or navigation system may indicate the exact location to the user. However, the user may not be able to distinguish between the object that was desired to be selected or indicated and another object nearby in the 2D image. Often, the objects are substantially apart geographically but appear very close in the 2D representation. Other methods that distinguish between objects in 2D images may be possible, but utilize image processing techniques such as edge detection, feature extraction, and complex filters that require high processing resources. The system for emphasizing objects in a panoramic image utilizes depthmap information to illustrate the selected object to the user based on the principle that any pixel and the surrounding pixels having similar depths make up the same object.

Depthmaps (depth maps) may be constructed from light detection and ranging (LIDAR) data. LIDAR, which may also be referred to as three-dimensional laser scanning or an optical distancing system, employs one or more lasers or "cameras" to collect data points representing an area, such as an area about a road or walkway. Software generates the depthmap based on the measured distance, the locations of the optical distancing system, which may be on a moving platform such as a car, and the angle of the laser. Other optical distancing systems include a stereoscopic camera, a time of flight infrared camera, and a structured light device. A LIDAR device collects and gathers data points in a point cloud in which each data point corresponds to a local coordinate, such as (x, y, z), and is either on or off. Alternatively, the LIDAR data may be a grayscale point cloud including an intensity (indicating reflectivity) for each data point, in a predetermined range of values (e.g., 0 to 255, 0 to 65536) with black at one end of the range and white at the other. The point cloud may be stored in ASCII or LIDAR exchange format (e.g., the American Society for Photogrammetry and Remote Sensing (ASPRS) .LAS file format). The one or more lasers may be in a near infrared spectrum (such as about 700 nm to about 5000 nm or about 800 nm to about 2500 nm) or other light spectrum.

FIG. 1 illustrates a system 150 for emphasizing objects in an image, such as a panoramic image. The system 150 includes a navigation device 100, a network 110, a server 120, and a database 130. The database 130 may be maintained by a map developer, such as NAVTEQ North America, LLC located in Chicago, Ill. The map developer may collect geographic data to generate and enhance the database 130. The navigation device 100 may be a cellular telephone (smart phone), a personal digital assistant ("PDA"), a tablet computer, a laptop, a personal navigation device ("PND"), an in-vehicle navigation system, a personal computer or another computing device.

The system 150 for emphasizing objects in or reimaging a panoramic image receives a depthmap generated from optical distance data of an optical distancing system. The optical distancing system may be a LIDAR device, a stereoscopic camera, or a structured light device. The depthmap is generated from the collected optical distance data. The depthmap may be created using any arbitrary viewpoint or perspective. The optical distance data is 3D data it is easily manipulate to any viewpoint or perspective, which is in contrast to a 2D image which is valid from a fixed viewpoint. Depthmaps may be generated for each panoramic image viewpoint and stored in the database 130. The depthmap includes position data (X-Y coordinates) and depth data (Z coordinate) for each of plurality of points.

The system 150 overlays the depthmap on a panoramic image according to the position data. Assuming the optical distance data and the panoramic image were collected from the same perspective and/or location, the overlay may involve combining the depth data with the image data of the panoramic image. If the depthmap and the panoramic image were collected from different angles and/or positions, additional geometric calculations are necessary to properly align the depthmap and the panoramic image. The associations between the pixels of the panoramic image and the depth map values may be stored in database 130. In other words, the depthmap and the panoramic image may be pre-aligned and the overlaid or combined data is stored in the database 130.

The user may select an object or a location on the panoramic image or a navigation or map application may select a map object shown on the panoramic image, which is received by system 150. The map object may be a destination, a point of interest, a turn cue, a street, an address, a route, a sign, a building, etc. The system 150 compares depth data of the first point to depth data of surrounding points and identifies an area on the panoramic image corresponding to the surrounding points having depth data within a predetermined range of the depth data of the first point. Within the panoramic image, a graphical effect is added that indicates at least one of the surrounding points.

The user may select the location on the panoramic by touch or mouse click. Alternatively, when the navigation or map application selects a map object, the selection may be made without any user input. For example, a navigation application may emphasize a map object by reimaging the panoramic image to illustrate the destination, the current path or route, the next turn, or any other navigation related map object. Further, points of interest are map objects that may be illustrated by reimaging the panoramic image. Points of interest may include buildings, addresses, location names, or store fronts.

The system and method for reimaging color images for any of these implementations utilizes depth information. The depth information provides each pixel with a 3D location that combined with the stored image geo-position and orientation provides the real-world position of each pixel as a 3D value. The 3D value is compared to other real-world 2D and 3D spatial map data, points, regions, paths, volumes, etc. to enhance the original 2D camera image based on real-world 3D objects rather than simple alterations in 'flat' 2D screen space.

For example, consider a navigation route that ends at a particular city building. The map database 130 is queried to find the geo-location and 3D shape/volume of the building, an image near the building, and an image depthmap. To indicate which building is important, the 3D depth values determine which 2D pixels overlap with the building volume. Since the process uses real depth values, objects in front of the building (e.g., a tree) would not have depth values that overlap the building 3D volume. Therefore, only pixels that represent the building are altered and tree pixels are left unaltered.

Now that pixels have been classified to distinguish between pixels within the building volume and those outside of the building volume, the image is reimaged to recolor either group of pixels using one of many effects. For example, the building classified pixels may be brightened and the non-building classified pixels may be blurred. Alternatively, saturation may be added to the building pixels and removed color from the non-building pixels. Dark edge lines may be drawn around the building by darkening pixels which have two neighbors that are classified as both a building pixel and a non-building pixel.

The image may also be reimaged to illustrate map queries. For example, a map application may be used to lookup a street address, business name, resident name, city name, or other point of interest. The map query identifies 2D or 3D point location. The distance of each other pixel, as measured using the 3D depth position, to the point of interest is used to emphasize only the image pixels that are within a specified 3D radius of the point of interest. In addition, for a 2D point of interest, the vertical component may be ignored so as to emphasize any pixel that is within a cylinder above the 2D point of interest.

The computing resources necessary for emphasizing objects in a panoramic image may be divided by the server 120 and the navigation device 100. In some embodiments, the server 120 performs a majority of the processing ("server-based embodiments"). The database 130 stores a depthmap generated from an optical distancing system, and the server 120 receives the depthmap from the database 130. The server 120 overlays the depthmap on a panoramic image according to the position data. The server 120 receives data indicative of an object in the panoramic image on the navigation device 100. The server 120 compares depth data of the first point to depth data of surrounding points and identifies an area on the panoramic image corresponding to the surrounding points having depth data within a predetermined range of the depth data of the first point. The server 120 transmits the panoramic image including a graphical effect that indicates at least one of the surrounding points to the navigation device 100.

In other embodiments, the navigation device 100 performs a majority of the processing ("user device-based embodiments"). The navigation device 100 receives a depthmap from the server 120. Alternatively, the navigation device 100 may receive the combined depthmap and panoramic image from the server 120. The image or panoramic image may be, for example, pixilated raster data in a bitmap, JPEG, GIF, and/or other image format. The panoramic image is displayed to a user. The user may have selected an object on the panoramic image or the navigation device 100 may have selected the object according to a route or a point of interest. The navigation device 100 compares depth data of the first point to depth data of surrounding points and identifies an area on the panoramic image corresponding to the surrounding points having depth data within a predetermined range of the depth data of the first point. The navigation device 100 alters the panoramic image by adding a graphical effect is added that indicates at least one of the surrounding points.

In a hybrid embodiment, the processing is divided between the server 120 and the navigation device 100. In one example, the server overlays the depthmap on the panoramic image and sends the combined depthmap and panoramic image to the navigation device 100, and the navigation device 100 adds the graphical effect. The overlaid depthmap and panoramic image may be pre-aligned and stored in the database 130.

For navigation related applications, the navigation device 100 may generate a location according to the geographic location of the navigation device 100. The location may be generated using positioning circuitry including one or more of a global navigation satellite system based on a satellite signal, a triangulation system that utilizes one or more terrestrial communication signals, a inertial position system based on sensors such as gyroscopes or accelerometers, and/or a or dead reckoning system based on a previously known position. The positioning circuitry may also determine an orientation using any of the above systems and/or a magnetic sensor such as a compass. The orientation and the location allow the appropriate depthmap and panoramic image to be selected based on the perspective of the user at the current geographic location of the navigation device 100.

The network 110 may include any combination of a cellular network, the Internet, or a local computer network. For example, the navigation device 100 may communicate with the network 110 wirelessly though protocols known as Wi-Fi, the protocols defined by the IEEE 802.11 standards, the protocols defined by the Bluetooth standards, or other protocols. Alternatively or in addition, the navigation device 100 may communicate with the network 110 wirelessly as a cellular network such as a Global System for Mobile Communication (GSM) or other third generation (3G) or fourth generation (4G) networks.

Figure 2A:
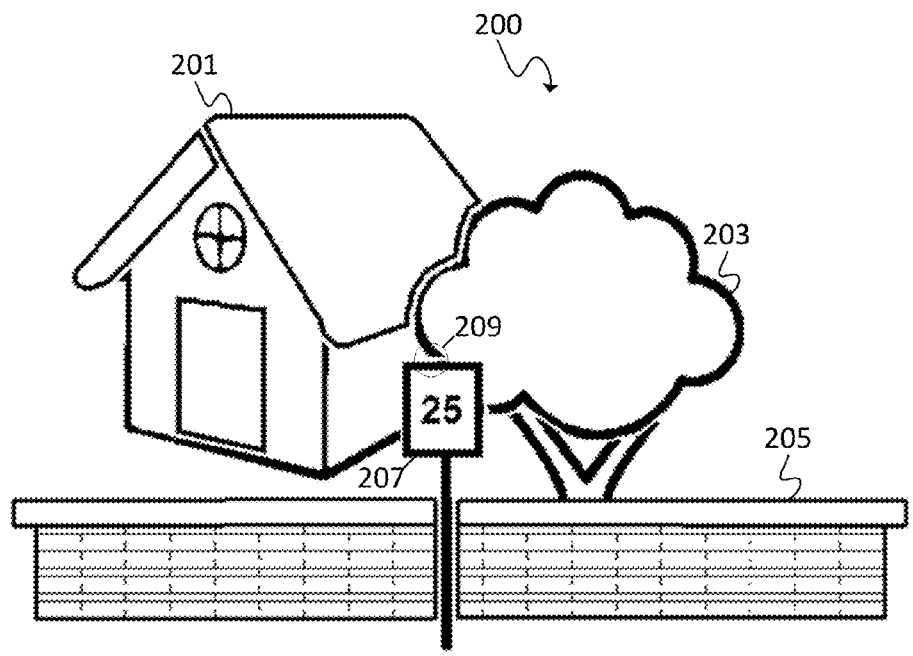
FIG. 2A illustrates an image for use with the navigation system or map system of FIG. 1.

FIG. 2A illustrates an image 200 for use with a navigation system or a map system. The image 200 may depict outdoor environments, as shown, indoor environments (e.g., shopping mall, convention center, etc.) or hybrid outdoor and indoor environments (e.g., fairgrounds, amusement park, etc.). Alternatively, the image 200 may be displayed in an augmented reality system. In the augmented reality system, the image 200 is received in real time by a camera on the navigation device 100.

The image 200 is reimaged by system 150 to emphasize a portion of the image 200. The image 200 may be a panoramic image, a street level view image, or a satellite view image. The image 200 includes objects at a plurality of depths. In the example shown in FIG. 2A, four depths are shown. A sign 207 is nearest to the viewer, which is followed by a wall 205, and a tree 203. A house 201 is the farthest from the view. A hypothetical user selection 209 is in an area in the image 200 that is very near the house 201, the tree 203, and the sign 207 in the image 200 even though in the physical world, these objects are relatively far apart.

Figure 2B:
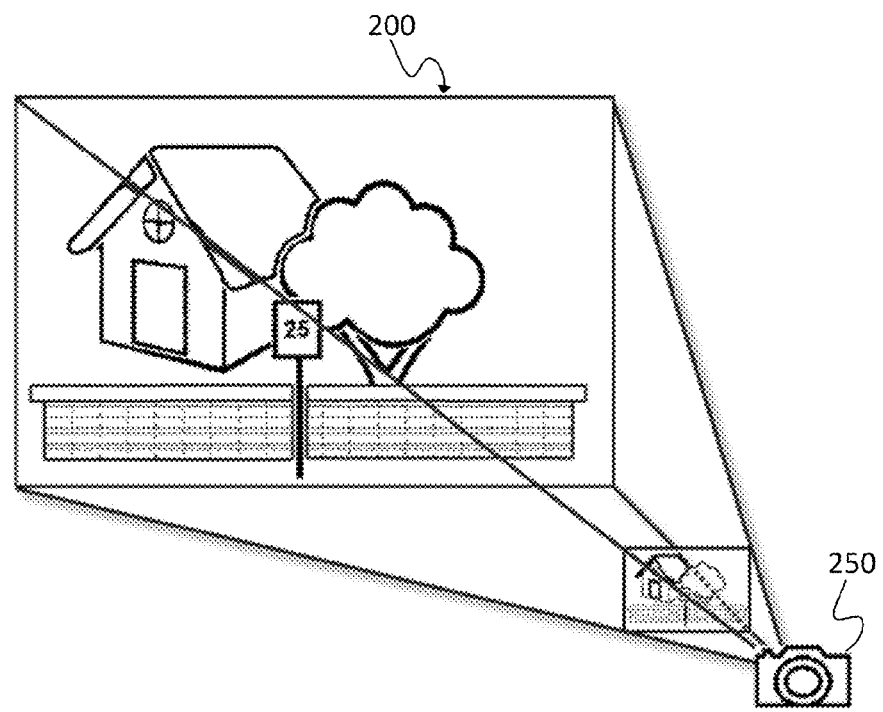
FIG. 2B illustrates a predetermined camera angle that the image was collected.

FIG. 2B illustrates a predetermined camera angle that the image 200 was collected by a camera 250. The predetermined camera angle may have one, two, or three components (e.g., roll, pitch, yaw) measured from any of three coordinate axes. The predetermined camera angle may be used to align the depth data to the panoramic image. The image 200 may be a planar image additionally defined by a field of view. Alternatively, the camera 250 may be an unknown position and/or orientation at the time the image 200 was collected. Feature matching may match features in the image 200 to known images in the database 130 in order to determine the position or orientation of the image. The camera 250 may be included in the user device 100.

Figure 3A:
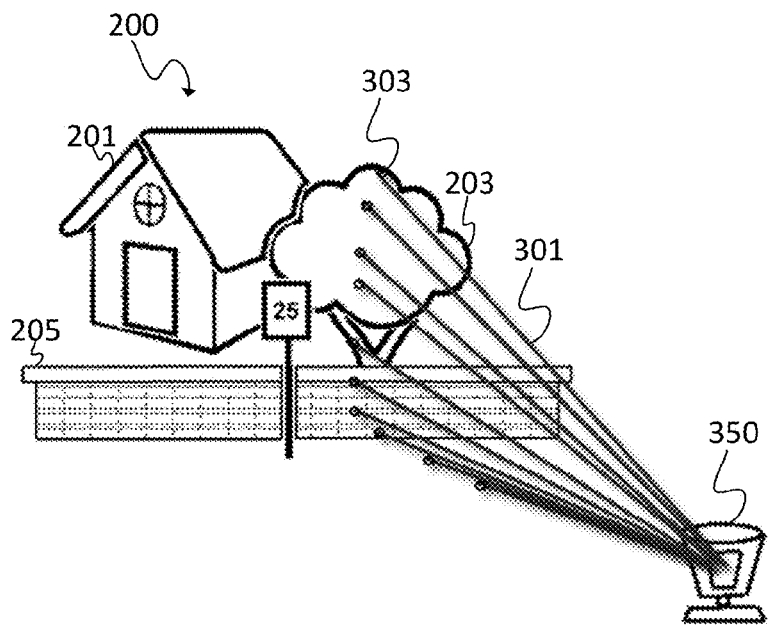
FIG. 3A illustrates the generation of optical distance data using the optical distancing system.
Figure 3B:
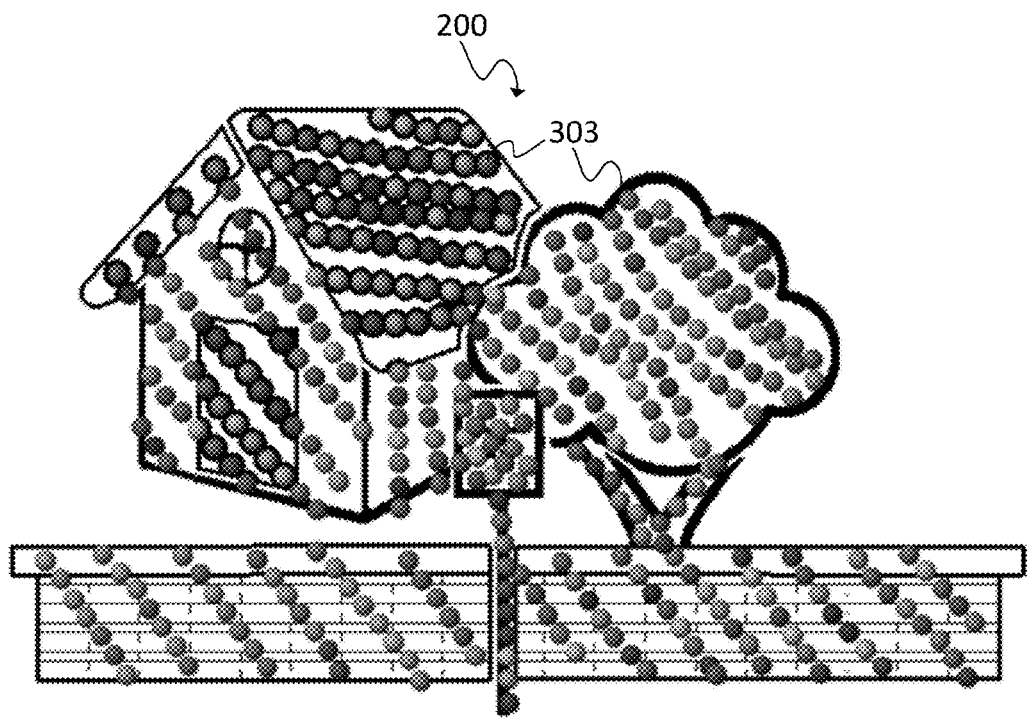
FIG. 3B illustrates depthmap data 303 as generated by the optical distancing system.
Figure 3C:
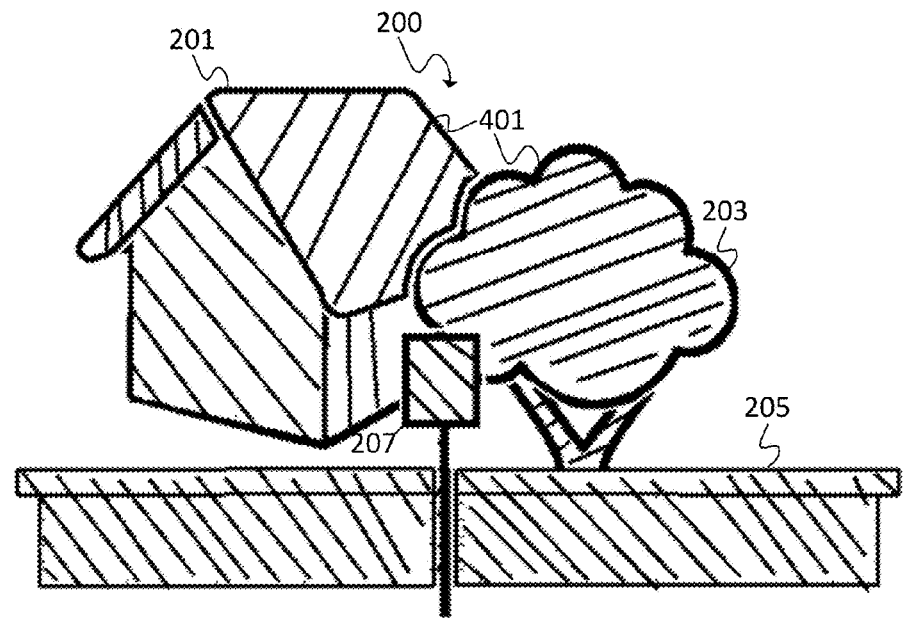
FIG. 3C illustrates depthmap data represented in scan lines.

FIG. 3A illustrates the generation of optical distance data using the optical distancing system 350. The optical distancing system 350 may be a LIDAR device, a stereoscopic camera, a time of flight camera, a structured light device, or another device. In the example of a LIDAR device, one or more (e.g., 1, 2, 10) lasers rotate about an axis. The optical distancing system 350 may be coupled with an inertial measurement unit (IMU) and/or an inertial navigation system (INS) in order to provide a geographic reference to the optical distance data. FIG. 3A illustrates one such plane including laser paths 301 and depth points 303. The optical distance system 350 measures the distance from the optical distancing system 350 to the various objects. In another example, the structured light device emits light onto objects and a camera captures images the structured light to determine distance based on the shape of the light in the captured images. The structured light may be infrared light or another light spectrum not visible to humans FIG. 3B illustrates depthmap data 303 as generated by the optical distancing system 350. The depthmap data 303 may be arranged approximately linearly because the laser scans in lines. FIG. 3B is not to scale and typically many more points are used than shown and may be in any arrangement. Objects that are closer to the optical distancing system 350 may be associated with a higher density of points and objects farther away from the optical distancing system 350 are associated with a lower density of points. FIG. 3C illustrates depthmap data represented in scan lines 401 of the optical distancing system 350. Other patterns may be used.

Figure 4:
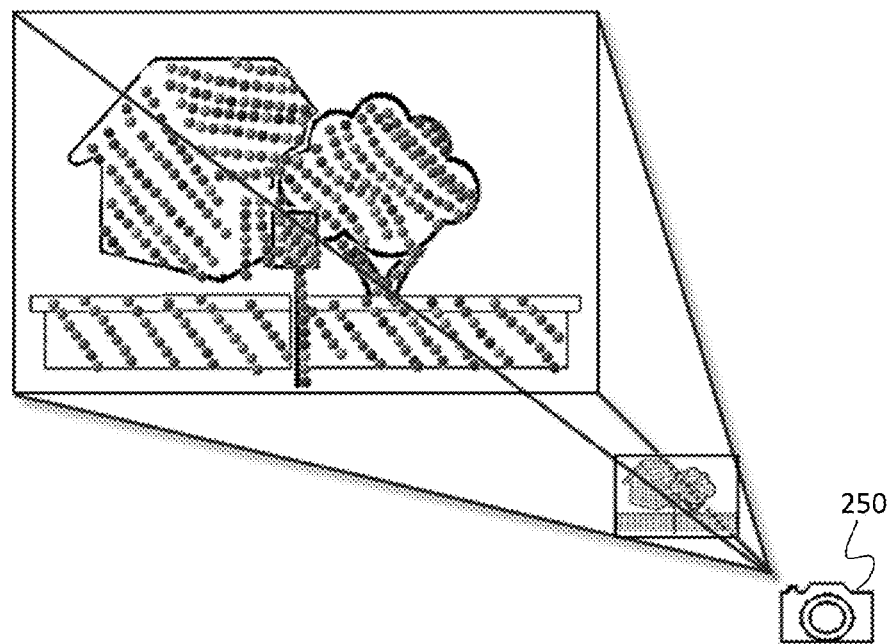
FIG. 4 illustrates alignment of the depthmap data.

FIG. 4 illustrates the depthmap data aligned with camera 250 at the angle of FIG. 2B. It should be noted that the optical distancing data may be received from any angle. However, at other angles, the optical distancing data may be manipulated to form depthmap data. The collected optical distance data may be true 3D data points. Because of the 3D nature of the points (as opposed to 2D image pixels), the data may be viewed from any angle. Therefore, a 'virtual' camera viewpoint of the 3D data may be simulated. In contrast, the camera capture of the image 200 is fixed based on 2D image data and a camera view direction. For example, the virtual camera viewpoint is simulated by creating a view of the 3D data from the same viewpoint as that of the 2D color image by projecting the 3D points onto the camera viewplane. The distance of the 3D point from the camera is saved to generate a depthmap image such that each RGB color pixel of the original image has a direct mapping to a value in the depthmap that represents the distance of the pixel from the camera.

Figure 5A:
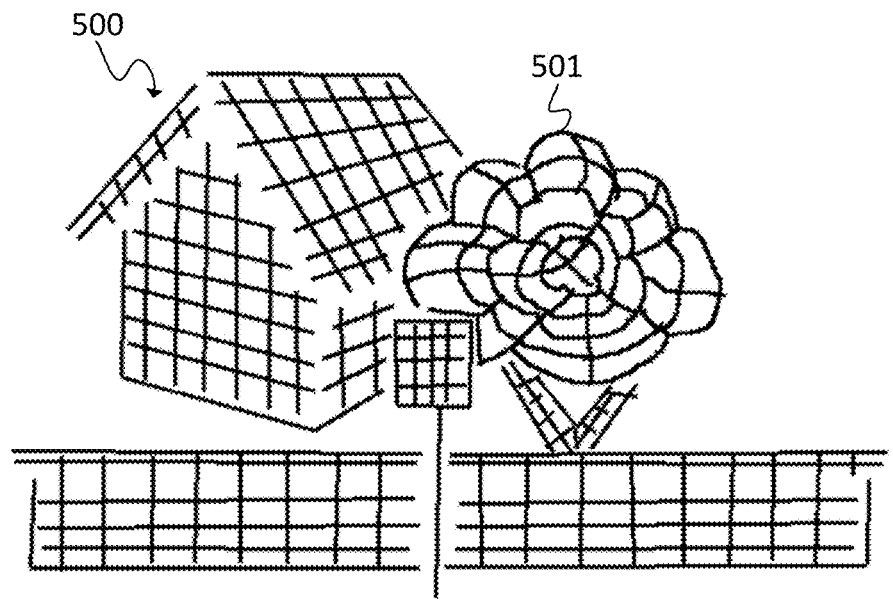
FIGS. 5A and 5B illustrate two example depthmap grids
Figure 5B:
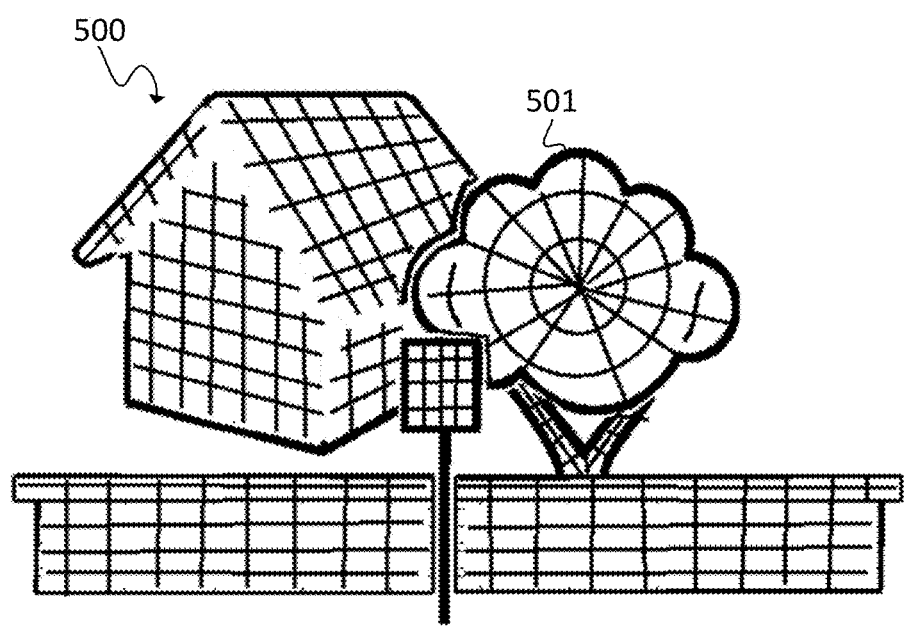

FIGS. 5A and 5B illustrate two example depthmap grids 500. Each cell 501 in the depthmap grid 500 spans multiple pixel locations. The depth data is displayed as a grid for demonstration purposes. However, each pixel may specify a unique depth value determined from the 3D sensor data points. Likewise, depth figures may be demonstrated by discrete depth values while in reality, these values may include a nearly continuous range of depth distances.

Generally, a depthmap is described as an image containing pixels that store depth values rather than RGB values. However, there are alternative mechanisms for storing and retrieving depth information. One mechanism for associating an image pixel with a depth value includes storing raw 3D points. An alternative mechanism includes pre-generating depth values for each image pixel and storing the depthmap as an image alongside the original color image. Another alternative mechanism includes converting the depthmap image pixels to a vector, polygon, or mesh based mapping to save space. The image may be converted to one of these vector/polygon/mesh representation by detecting approximate edges and gradients in the depth image. This storage model may be more efficient for storage and delivery due to smaller memory requirements. FIGS. 5A and 5B illustrate a mesh type depth map storage model.

Figure 6A:
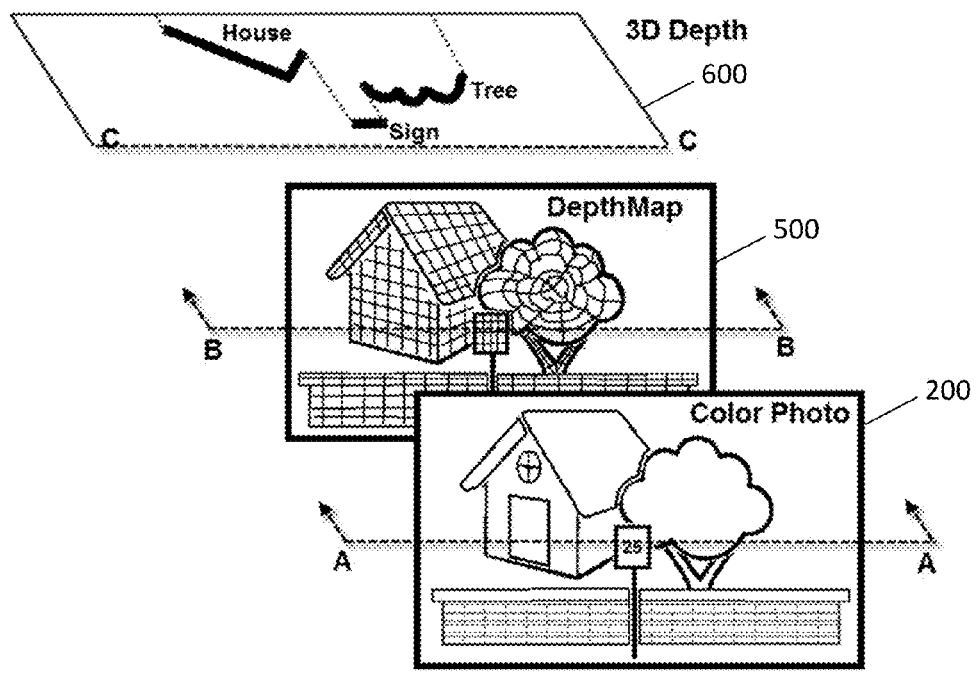
FIGS. 6A and 6B illustrate the calculation of depth values.
Figure 6B:
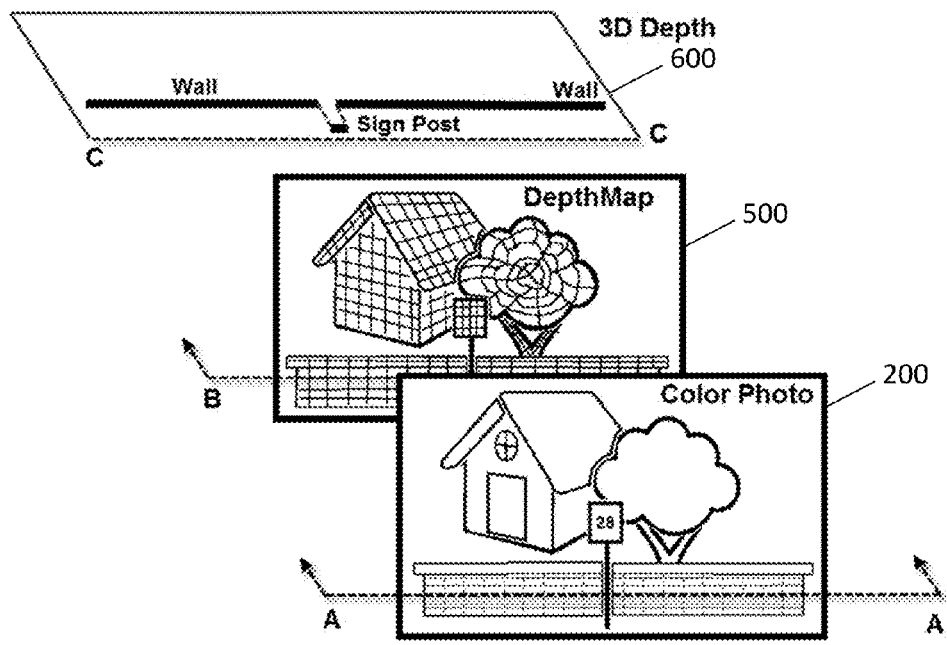

FIGS. 6A and 6B illustrate the calculation of image mapped depth values from a pre-generated depthmap. FIG. 6A illustrates a first cross section A-A of the image 200, which corresponds to a second cross section B-B in the depthmap grid 500. The C-C cross section plane or top down view 600 in FIG. 6A shows the depth values are defined to correspond to the sign 207, house 201, and tree 203. The depth map cross section C-C indicates that the house 201 is the furthest from the camera while the sign 207 is the closest. FIG. 6B illustrates a first cross section A-A of the image 200, which corresponds to a second cross section B-B in the depthmap grid 500. The C-C cross section plane or top down view 600 in FIG. 6B shows the depth values are defined to correspond to the sign 207 and the wall 205.

Figure 7:
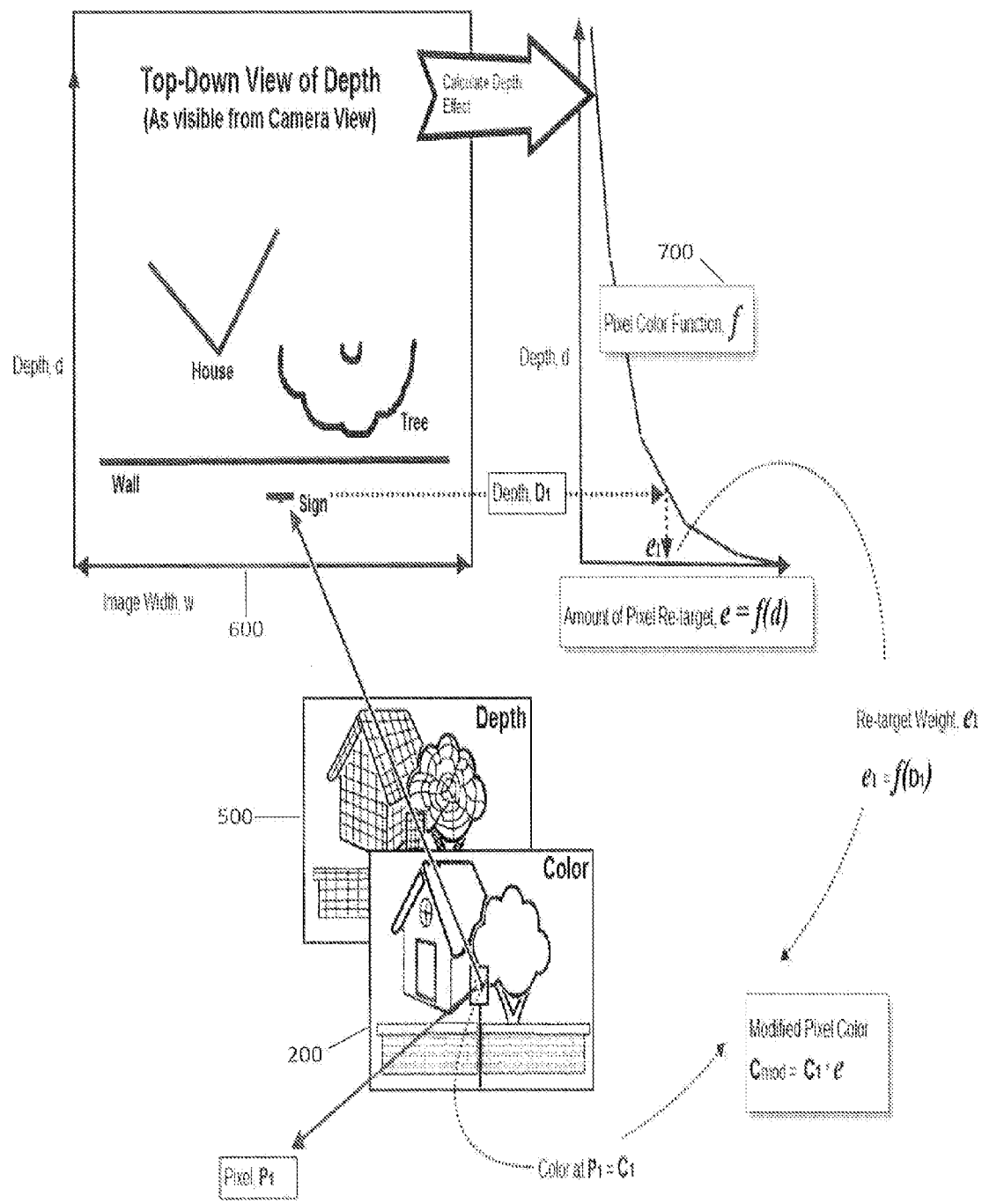
FIG. 7 illustrates the selection of points for reimaging.

FIG. 7 illustrates the selection of points for reimaging. Reimaging includes emphasizing, de-emphasizing, isolating, highlighting, accentuating, or focusing a region or object in the image. Each pixel, for example pixel $P_1$ in the image 200 aligns with a particular depth value $D_1$ in the depthmap 500. The top-down view 600 illustrates the magnitude of each of the depth values that are associated with the sign 207, wall 205, house 201, and tree 203. Specifically, the depth value $D_1$ of the sign 207 is shown measured along the depth axis d.

A pixel color function 700 calculates the modified pixel color for reimaging. The pixel color function 700 may be linear, quadratic, cubic, logarithmic, or another type of function of depth. As shown in FIG. 7, the pixel color function 700 may be a continuous function or a series of piecewise linear portions to approximate the function. Depth values are input to the pixel color function 700, and a re-target weight e is output from the pixel color function 700 (e.g., $f(D_1)=e_1$). The depth values input to the pixel color function 700 may be a reference depth value of the pixel $P_1$ (e.g., depth value $D_1$ as measured along the depth axis d) or a calculated depth value measured from a selected pixel. The re-target weight e may be multiplied by the original pixel value color value $C_1$ to arrive at the modified pixel color value $C_{mod}$.

Depending on the pixel color function 700, many graphical effects are possible. The pixel color function 700 may produce an outline of a physical object. For example, the pixel color function 700 may define e as at or near 1.0 for all values near the depth of $D_1$ and significantly increase or decrease e for a group of surrounding pixel on the edge of a change in depth values. Pixel values at or near the selected pixel depth treated differently than pixels where the depth changes significantly. Essentially, e is calculated as a flood fill using depth values and depth gradients. The flood fill continues from the user selected depth until a large change in depth is detected. For edge highlighting, the edge values of the resulting flood fill may be assigned low e values (dark), while all other pixels are defined with e=1 (no color change). Thus the outline of the selected object is displayed.

The pixel color function 700 may use the re-target weight e as a blur factor rather than a darkening factor. The result is that pixels with specific depths will have a specific amount of blur. For example, a function that defines that e (in this case a blur radius scale factor) as decreasing with depth will produce an image that appears to get more blurry as objects get further from the camera. In other words, rather than an object in the panoramic image, the location that determines the graphical effect in the panoramic image may be a perspective used to select the panoramic image. The pixel color function 700 may invert portions of the image 200. The pixel color function 700 may fade portions of the panoramic image by setting the re-target weight e to a fraction for certain depth values. Further, the pixel color function 700 may hide portions of the panoramic image by setting the re-target weight e to 0 for a specific range of depth values, which results in cutting pixels from portions of the image 200 or removing portions of the image 200.

Another application is to retarget the entire image based on the depth of each pixel depth from the camera (rather than a user-defined location or a map/navigation application defined location) to simulate a camera depth of field blur or simulate a night view where light falls off rapidly as objects recede from the camera. The re-target weight e is defined for each color pixel based on the associated depth value. The user may specify a focal distance such that pixels at this distance are not altered, but pixels closer or further blurred more as the pixels are further from the focal distance.

Figure 8A:
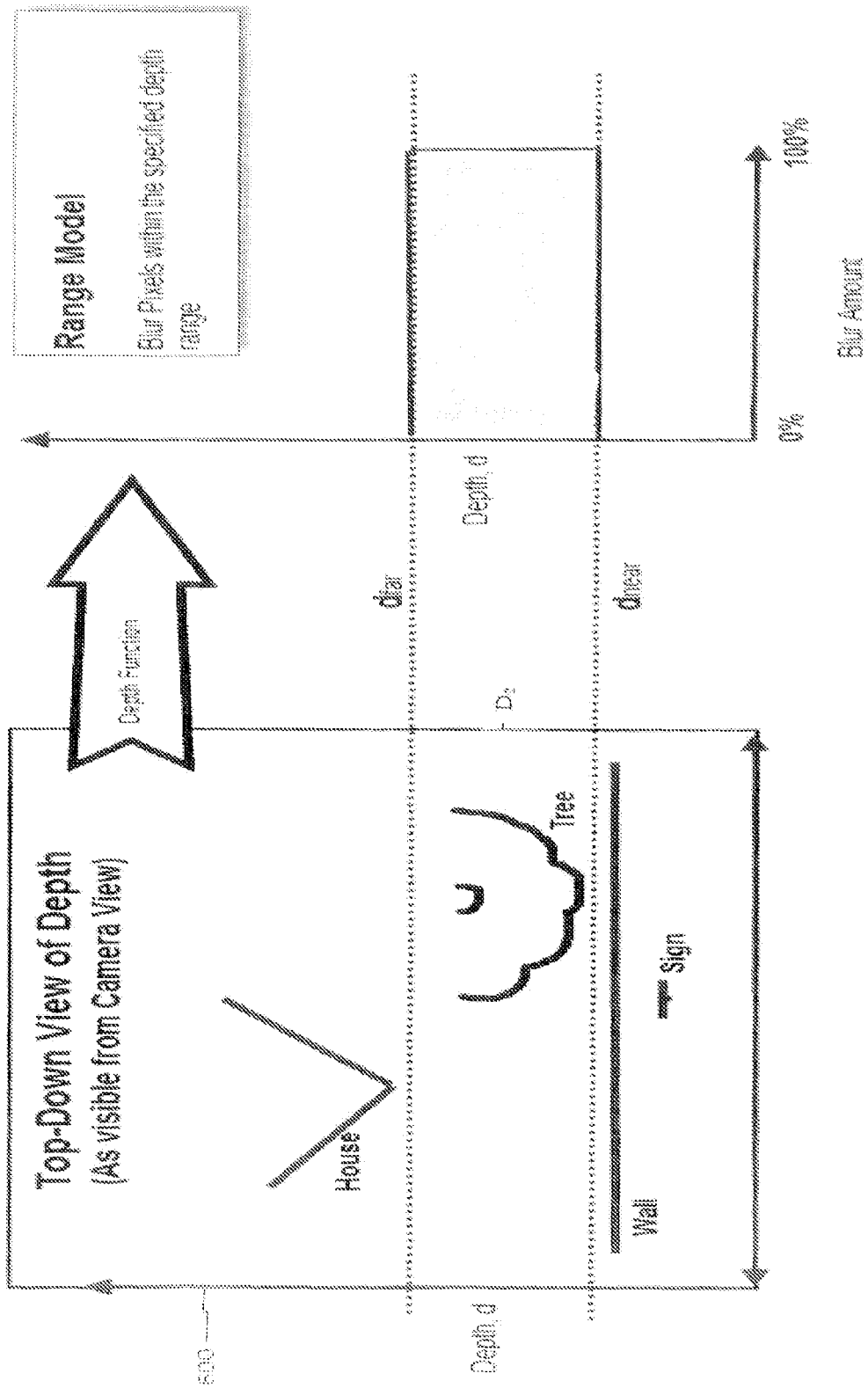
FIG. 8A illustrates an embodiment where the graphical effect is blurring.

FIG. 8A illustrates an embodiment where the graphical effect is blurring. The top-down view 600 again illustrates the sign 207, house 201, tree 203, and wall 205. In this example shown in FIG. 8A, a point on or near the tree 203 has been selected. The point on or near the tree 203 corresponds to a depth value $D_2$. A depth function may define a predetermined range of depth values that will be blurred and a blur amount. The predetermined range of depth values may be centered around $D_2$ or off center. For example, $d_{far}$ may be defined as $D_2$ plus a predetermined amount and $d_{near}$ may be defined as $D_2$ minus the predetermined amount. In the example shown in FIG. 8A, the tree 203 is blurred at 100% and all other objects in the image 200 are not blurred or reimaged.

Figure 8B:
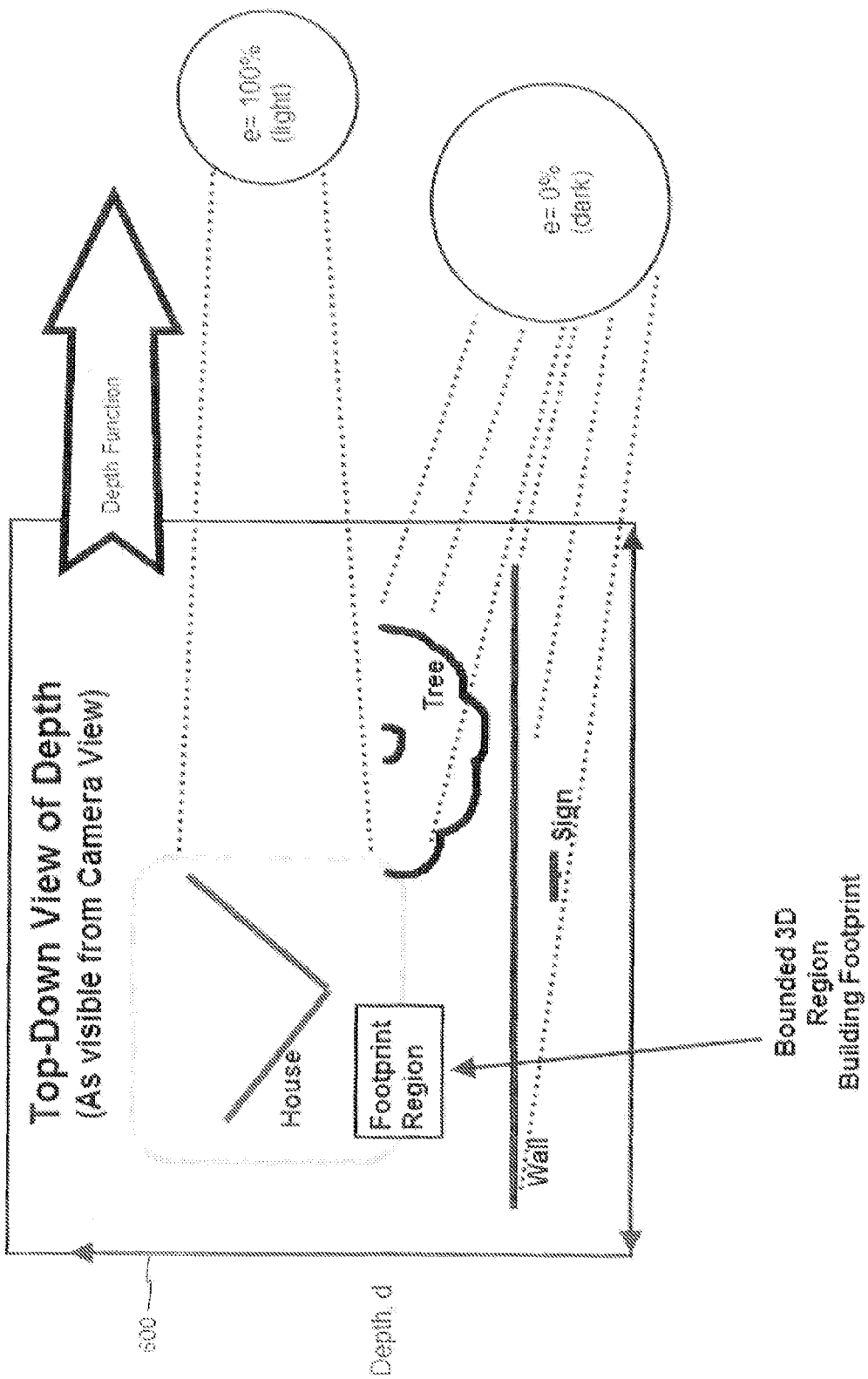
FIG. 8B illustrates an embodiment where the graphical effect is highlighting.

FIG. 8B illustrates an embodiment where the graphical effect is highlighting. The top-down view 600 again illustrates the sign 207, house 201, tree 203, and wall 205. Each object is associated with a footprint region in the database 130. In this example shown in FIG. 8B, a pre-defined region from a map/building database is used to determine which 3D region or footprint region is of interest. For example, a user may input a building name or address that is associated with the 3D region in the map/building database. A subset of pixels surrounding the selected point that fall within the same 3D region is modified to attract user attention to the house 201. Likewise, the 3D region may be defined as the region above some 2D footprint (regardless of height). These calculations are possible because the depth of each pixel is included in the depthmap, and the 3D position of each pixel may be determined based on the depth, image position, and direction in 3D space. For example, as indicated in FIG. 8B, the house 201 may be shown brighter than other portions of the image 200 because the 2D image pixels (combined with depth) lie within the defined 3D building volume. In another example, the 2D footprint of an object may be reimaged to highlight a characteristic of the object. For example, the 2D area footprint of a park may be tinted green or the 2D area of a body of water may be tinted blue.

Figure 9A:
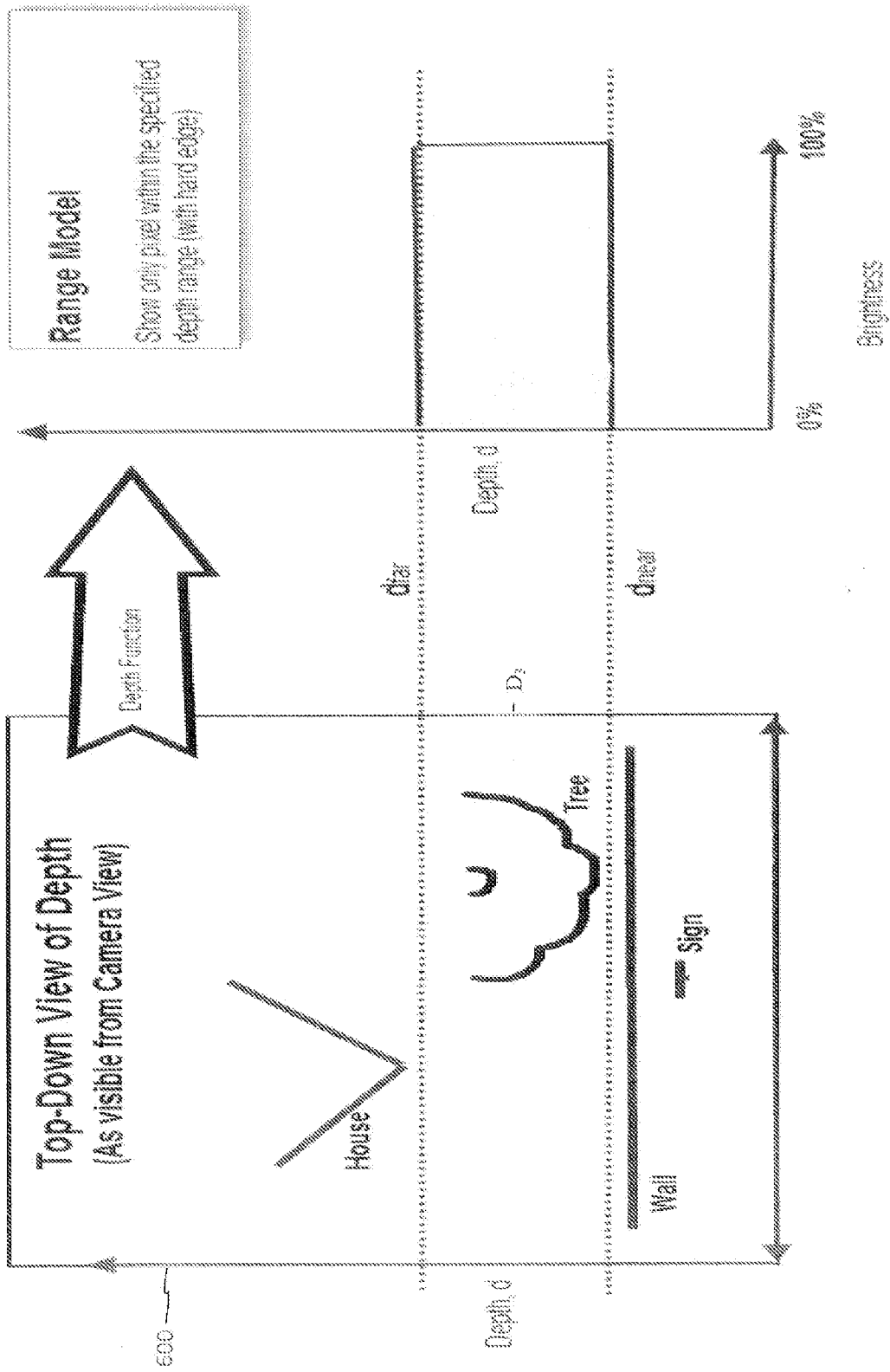
FIGS. 9A, 9B and 9C illustrate another embodiment where the graphical effect is highlighting.

FIG. 9A illustrates another embodiment where the graphical effect is highlighting. The top-down view 600 again illustrates the sign 207, house 201, tree 203, and wall 205. In this example shown in FIG. 9A, a point on or near the tree 203 has been selected. The point on or near the tree 203 corresponds to a depth value $D_3$. A depth function may define a predetermined range of depth values that will be brightened and a brightness amount. While 100% brightness is shown, any amount could be used. Further, the brightness could vary for depths moving away from $D_3$.

Figure 9B:
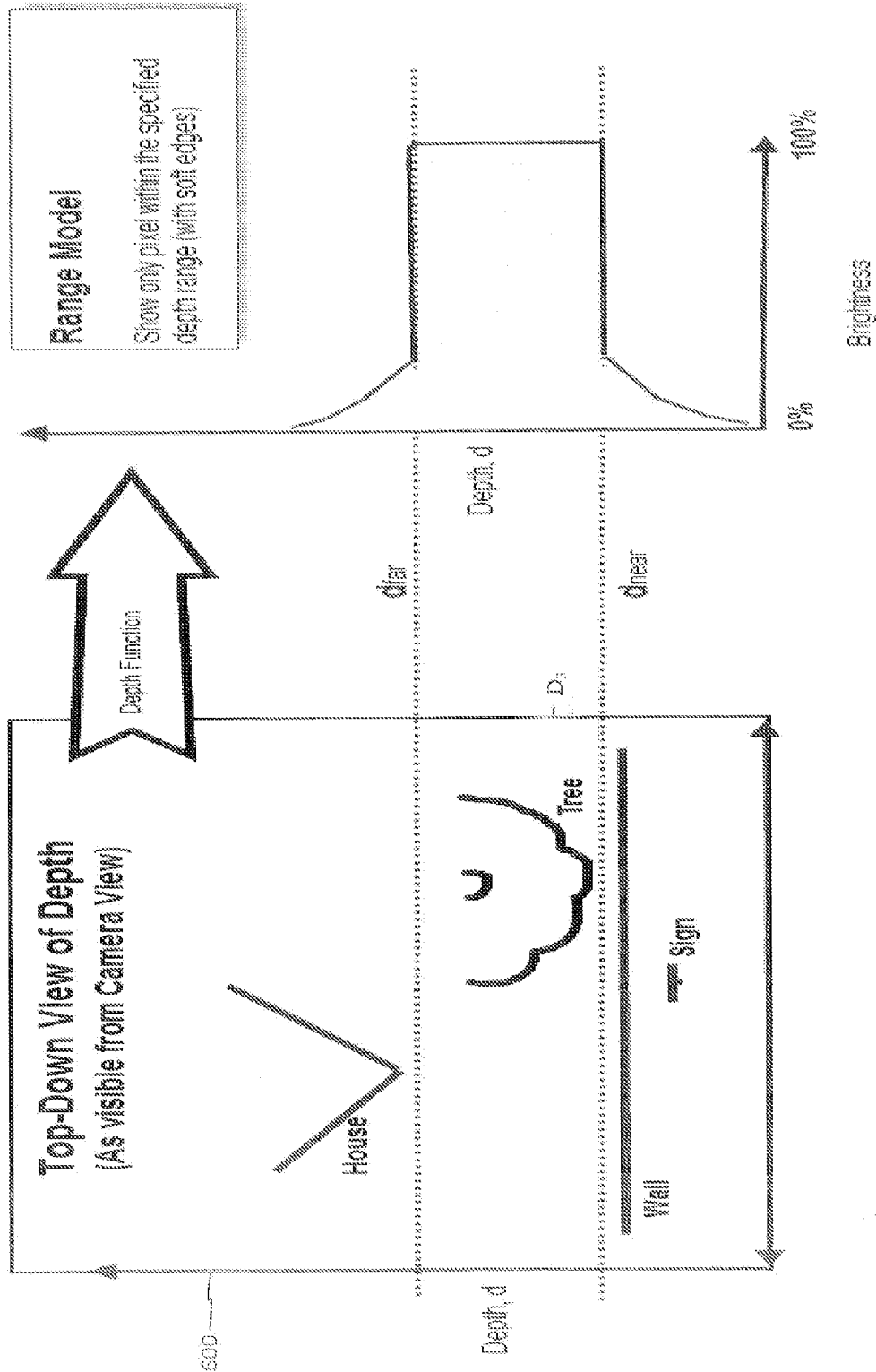
Figure 9C:
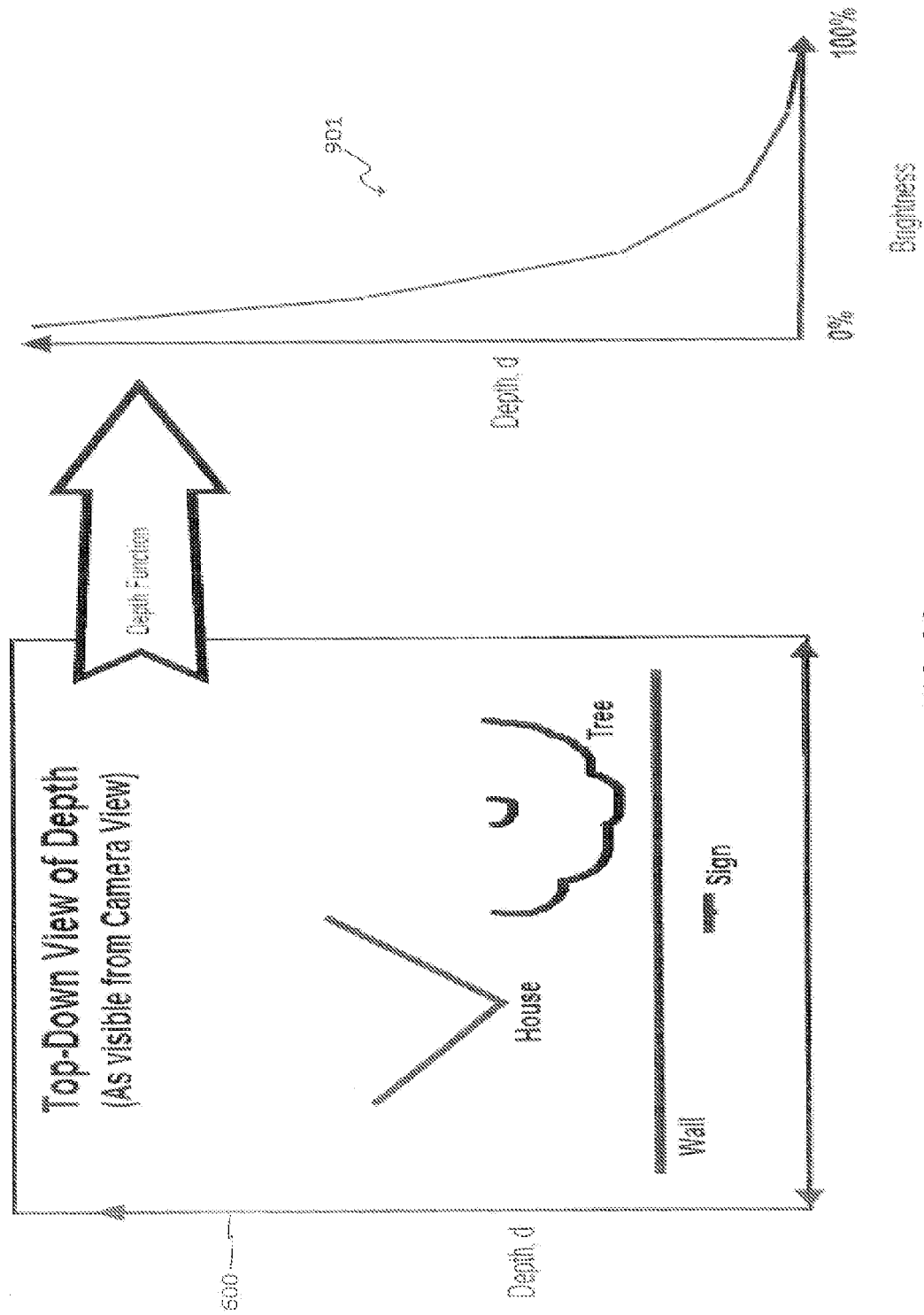

FIG. 9B illustrates a variation of the embodiment of FIG. 9A. In FIG. 9B, the depth function pixels fade out from the predetermined range between $d_{far}$ and $d_{near}$. This is one example of an intensity fall off model to gradually change the fade amount. The pixels fade out as the distance in the depth direction from the selected pixel increases. FIG. 9C illustrates another example of an intensity fall off model 901 where pixels fade out as the depth increases.

Figure 10:
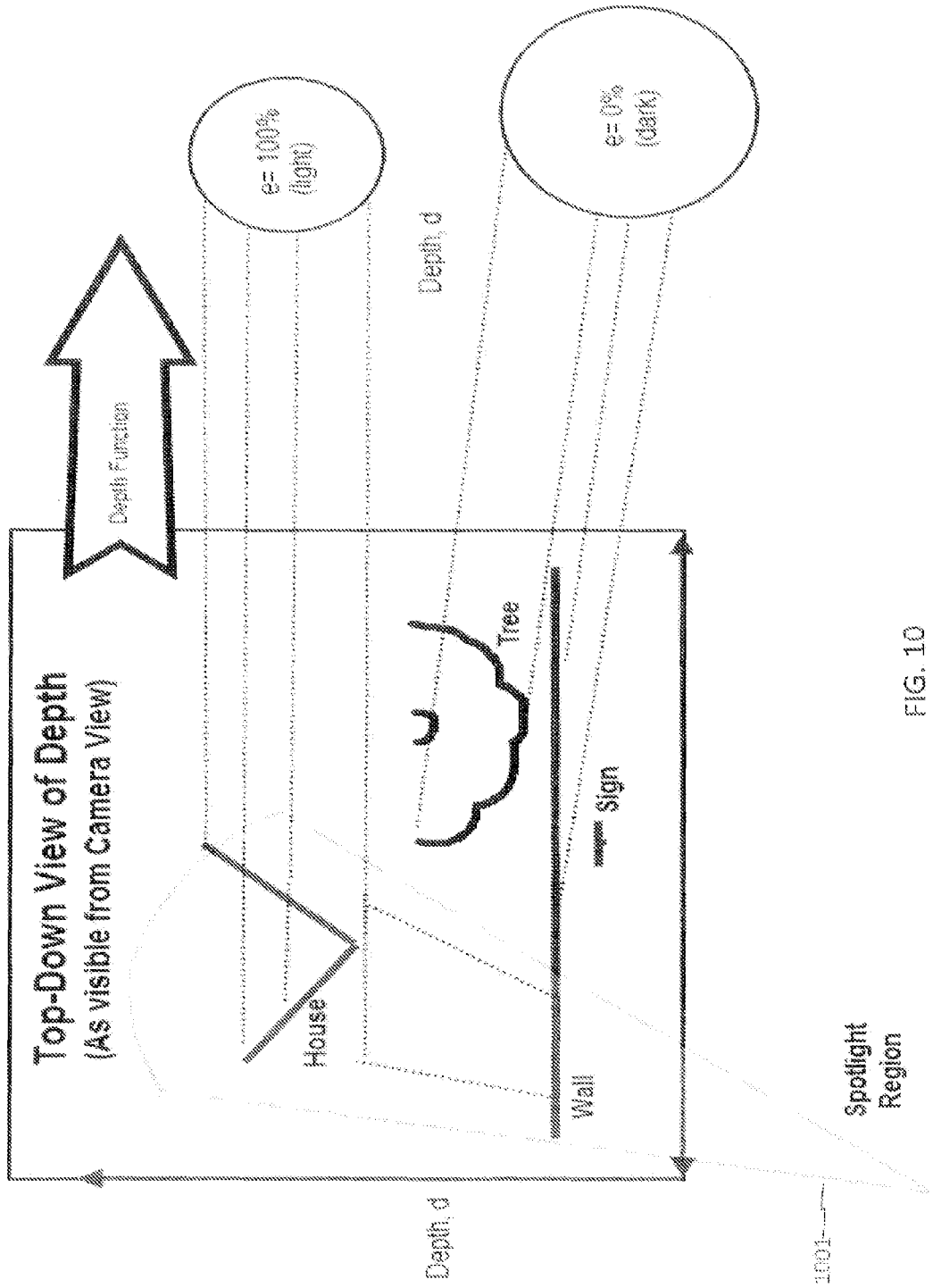
FIG. 10 illustrates an embodiment in which the graphical effect is a simulated spotlight.

FIG. 10 illustrates an embodiment in which the graphical effect is a simulated spotlight. The depth function for the simulated spotlight utilizes both the depth data and the 2D position in image 200 to determine whether each pixel falls within or outside of the light cone 1001. Those pixels outside the light cone 1001 are reduced in intensity or brightness. Within the light cone 1001, the intensity or brightness may be faded based on a distance from the center of the cone 1001. In other words, an intensity of each of point surrounding a selected point is a function of a distance to the selected portion. A user selection may specify the spot light direction such that the spotlight follows the user's mouse and simulates 3D interaction on a 2D image.

The depthmap combined with the image 200 builds a true 3D model. Accordingly, the spot light may appear behind some objects and in front of others. For the example in FIG. 10, the depth information reveals that the house pixels are lit with the spotlight, while the tree is not. From the 2D view, the cone of the spot light intersects the tree. However, the depth information indicates that the spot light is actually behind the tree. This would not be possible with the depthmap information.

Further, a day time photo can be simulated as a night view with a localized light source. A light source location is defined. The depth of each pixel in the panoramic image 200 is used to determine a 3D location and distance from the light source location. Pixels of the panoramic image 200 are darkened based on some function of distance from the light source. The function may be based on square of distance.

Figure 11:
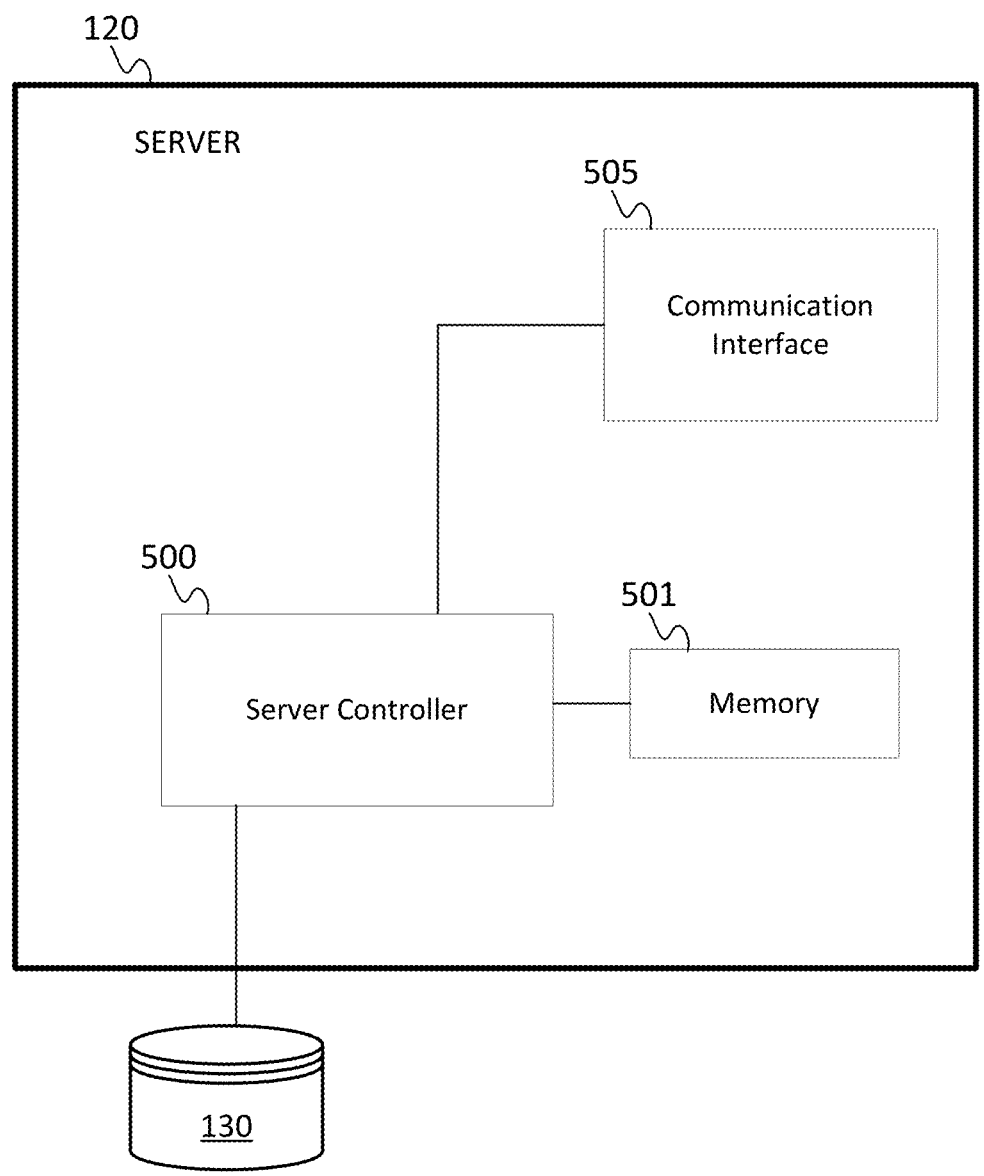
FIG. 11 illustrates a detailed view of the server of FIG. 1.
Figure 12:
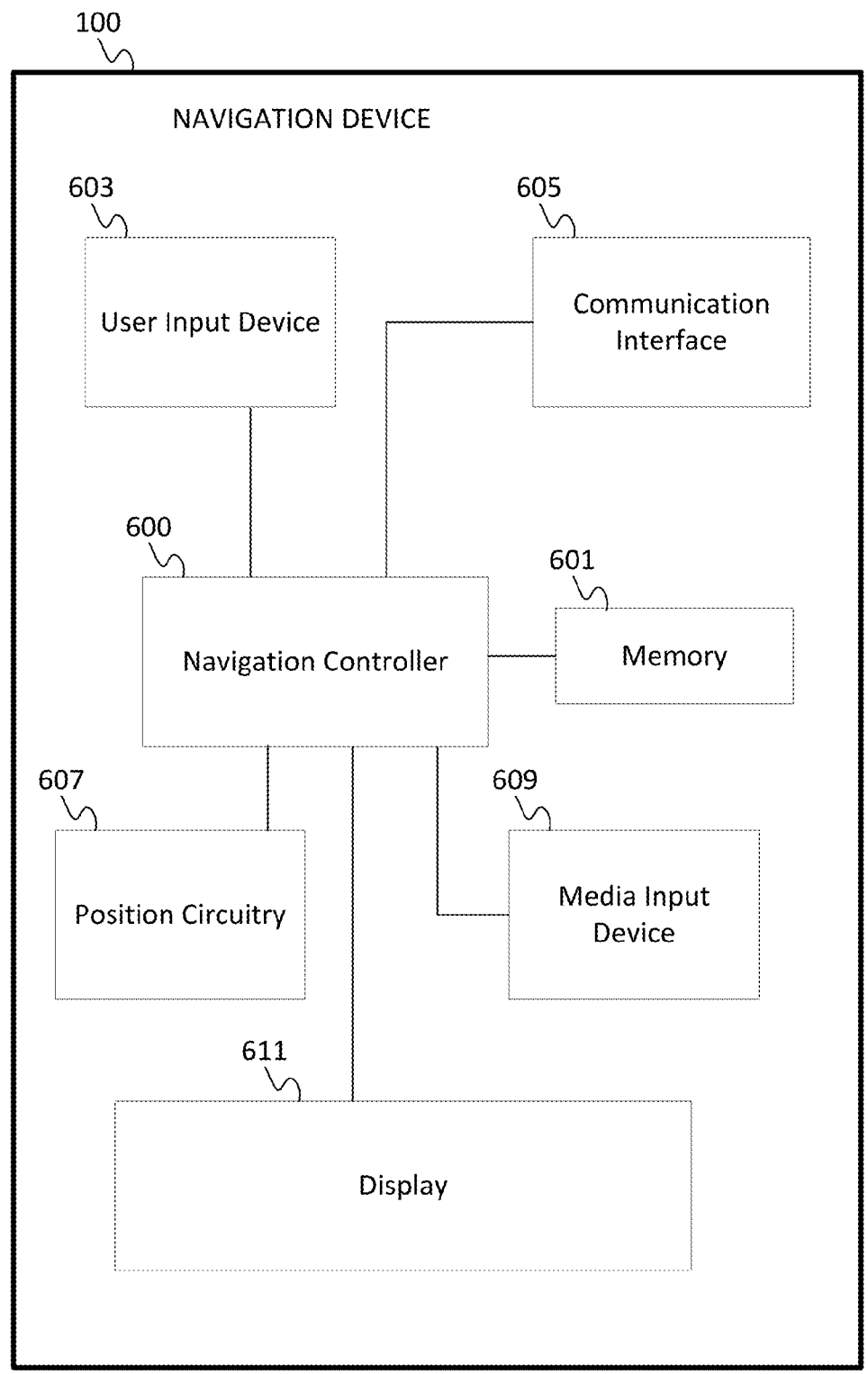
FIG. 12 illustrates a detailed view of the navigation device of FIG. 1.

FIG. 11 illustrates a detailed view of the server 120 of FIG. 1. The server 120 includes a server controller 500, a memory 501, and a communication interface 505. The database 130 may be external or internal to the server 120. In the server-based embodiments, the server 120 is apparatus for emphasizing objects in a panoramic image. FIG. 12 illustrates a detailed view of navigation device 100 of FIG. 1. In the user device-based embodiments, the navigation device 100 is an apparatus for emphasizing objects in a panoramic image. The navigation device 100 includes a navigation controller 600, a memory 601, a communication interface 605, and position circuitry 607. The navigation device 100 may also include a user input device 603, a media input device 609, and a display 611.

As discussed above, the apparatus for emphasizing objects in the panoramic image may operate with or without position data for the current location of the navigation device 100. When the position data is used in the server-based embodiments, the position circuitry 607 determines a current geographic position of the navigation device 100 and the communication interface 605 sends the current geographic position to the server 120. When the position data is used in the user-device based embodiments, the position circuitry 607 determines location data including the position and/or the orientation of the navigation device 100. The location data may be generated using one or more of a global navigation satellite system based on a satellite signal (such as Global Positioning System (GPS), the Russian GLONASS or European Galileo), a triangulation system that utilizes one or more terrestrial communication signals, a inertial position system based on relative position sensors such as gyroscopes, accelerometers, and altimeters, and/or a or dead reckoning system based on a previously known position. The orientation may be determined using any of the above systems and/or a magnetic sensor such as a compass or a three dimensional magnetic sensor array. Magnetic sensors determine the direction and or strength of a magnetic field and can be used to determine heading or orientation. Inertial sensors such as accelerometers and gyroscopes measure acceleration, which can be used to calculate position, orientation, and velocity (direction and speed of movement) of the navigation device 100. The location and/or orientation data may be used to select the depthmap 500 and the panoramic image 200 from the database 130.

In the server-based embodiments the memory 501 stores the depthmap generated from the optical distancing system and the panoramic image 200. The server controller 500 is a processor configured to receive a user selected location on the panoramic image 200 and overlay the depthmap on the panoramic image according to position data to identify a focus area on the panoramic image corresponding to the user selected location. The focus area is defined according to a function of the depth data of the user selected location and the depth data of points surrounding the user selected location. The function may be any of the color pixel functions 700 or depth functions discussed above or any shown in FIGS. 7-10. Based on the output of the function various reimaging techniques may be used to illustrate the focus area to the user. Such graphical effects include, but are not limited to an outline of a physical object, a highlighting a 3D region such as a building from a map database, a blurring of the focus area, a color inversion of the focus area, a fading of the focus area, a flood fill of the focus area, cutting pixels from portions of the panoramic image, or removes portions of the panoramic image. Similar effects may be applied to the areas outside of the focus area.

In the user device-based embodiments, the memory 601 stores the depthmap generated from the optical distancing system 350 and the panoramic image 200, which are downloaded from the server 120. The user input device 603 receives data indicative of a user selected location on the panoramic image 200. The navigation controller 600 is a processor configured to receive the user selected location and overlay the depthmap on the panoramic image 200 according to position data to identify a focus area on the panoramic image corresponding to the user selected location. The focus area is defined by examining surrounding points according to a function. The analysis may occur pixel by pixel. The function receives inputs of the depth of the user selected location and the depth of surrounding pixels.

The surrounding pixels may be defined several ways. For example, the surrounding pixels may be the pixels that border the user selected location, the surrounding pixels may be within a predetermined pixel distance (e.g., 50, 100, or 1000 pixels away) from the user selected location, or the surrounding pixels may be a share of the image 200 (e.g., the closest 10%, 25% or 50%). Regardless of the definition, each of the surrounding pixels is examined by the server controller 500 or navigation controller 600. While the analysis may take many forms, two types of analysis are discussed in detail below.

In a first type of analysis, the server controller 500 or navigation controller 600 compares the depth of each of the surrounding pixels to the depth of the user selected location to calculate a gradient quantity. If the difference between the depth of a surrounding pixel and the depth of the user selected location (gradient quantity) is below a predetermined threshold, the pixel is declared to be on the same object in the image 200 as the user selected location. In other words, the surrounding pixel is in the focus area and may be subject to the graphical effect. The first type of analysis is repeated for subsequent surrounding pixels to identify points for which the predetermined value exceeds the gradient quantity.

In a second type of analysis, the server controller 500 or navigation controller 600 divides the depth data of surrounding pixels into a first level of surrounding points and a second level of surrounding points. The first level of surrounding points is closer to the user selected location in the image 200 than the second level of surrounding points. The specific division between the first level and the second level may vary. For example, the first level of surrounding points may include a certain number of pixels (e.g., 100, 1000) closest to the user selected points, and the second level of surrounding points may include the remaining surrounding points.

The server controller 500 or navigation controller 600 calculates a first gradient based on the rate of change of the depths of first level of surrounding points and a second gradient based on the rate of change of the depths of the second level of surrounding points.

The first gradient is compared to the second gradient to determine the size of the focus area. For example, the focus area may include the first level of surrounding points or both the first level of surrounding points and the second level of surrounding points. A gradient threshold may be stored in memory 501 or memory 601. The gradient threshold defines the rate of change of depth values necessary to distinguish between object in the image 200. When the difference between the second gradient and the first gradient is more than the gradient threshold only the first level of surrounding pixels receive the graphical effect. When the difference between the second gradient and the first gradient is less than the gradient threshold, both the first level of surrounding pixels and the second level of surrounding pixels receive the graphical effect.

The user input device 603 includes one or more buttons, keypad, keyboard, mouse, stylist pen, trackball, rocker switch, touch pad, voice recognition circuit, or other device or component for inputting data to the navigation device 100. The user input device 603 and the display 611 may be combined as a touch screen, which may be capacitive or resistive. The display 611 may be a liquid crystal display (LCD) panel, light emitting diode (LED) screen, thin film transistor screen, or another type of display.

The navigation controller 600 or server controller 500 may include a general processor, digital signal processor, an application specific integrated circuit (ASIC), field programmable gate array, analog circuit, digital circuit, combinations thereof, or other now known or later developed processor. The navigation controller 600 or server controller 500 may be a single device or combinations of devices, such as associated with a network, distributed processing, or cloud computing.

The memories 501, 601 may be a volatile memory or a non-volatile memory. The memory 501, 601 may include one or more of a read only memory (ROM), random access memory (RAM), a flash memory, an electronic erasable program read only memory (EEPROM), or other type of memory. The memory 501, 601 may be removable from the navigation device 100, such as a secure digital (SD) memory card.

The communication interfaces 505, 605 may include any operable connection. An operable connection may be one in which signals, physical communications, and/or logical communications may be sent and/or received. An operable connection may include a physical interface, an electrical interface, and/or a data interface. The communication interfaces 505, 605 provides for wireless and/or wired communications in any now known or later developed format.

In an alternative embodiment, the navigation device 100 may omit the position circuitry 607 or use of the position circuitry 607. In this alternative embodiment, the navigation device 100 may be a personal computer, which encompasses laptops and other mobile processing platforms.

Figure 13:
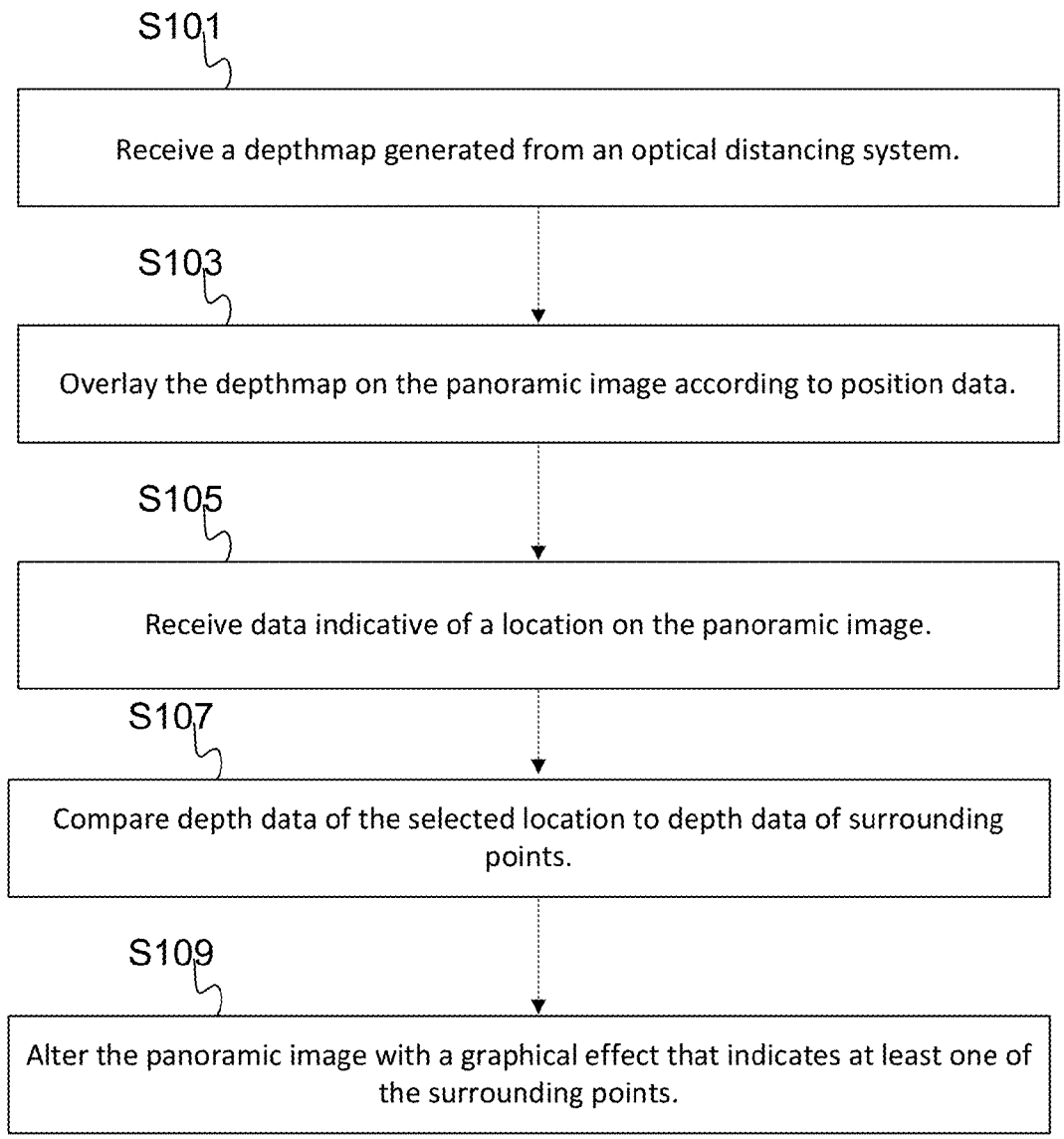
FIG. 13 illustrates a flowchart for reimaging a panoramic image.

FIG. 13 illustrates a flowchart for an algorithm for reimaging a panoramic image and emphasizing objects in the panoramic image. As discussed above, the algorithm may be performed with or without using the user's current location and may be performed on the navigation device 100, the server 120, or a combination of the two. A processor (e.g., server controller 500 or navigation controller 600) generally performs the steps in the algorithm. Fewer, more, or different steps or acts may be provided, and a combination of steps may be provided. Also, the steps or acts may be performed in the order as shown or in a different order. The method is implemented by the system and/or devices described herein or by different devices or systems.

At S101, the processor receives a depthmap generated from the optical distancing system 350. The depthmap was generated from collected optical distance data in the physical world and describes distances to objects in the physical world from the optical distancing system 350 and the time of collection. The distances may be measured by time of flight (laser, infrared), structured light, or a stereoscopic camera.

At S103, the processor overlays the depth map on a panoramic image. The panoramic image may be part of a map database including one or more of street level images or high-altitude level maps. The panoramic image may be several photographs stitched together or may include a single photograph. If the panoramic image and the optical distance data were taken from similar locations and orientation, the overlay may involve simply combining the depth values of the depth map to the two-component data of the panoramic image. If the panoramic image and the optical distance may were collected from difference locations and/or orientations geometric calculations are used to align the depthmap and the panoramic image.

At S105, the processor receives data indicative of a location on the panoramic image. The data may be data received from the user input device 603, which may be a touch screen or a display. The data may be received from a map application or a navigation application. Alternatively, the data may be based on a user input. The location corresponds to an object in the panoramic image. The object may be a destination, such as a road, a name on a sign, or a building or another point of interest. The selected location is associated with pixels in the panoramic image and accordingly, depth data in the depth-map overlaid on the panoramic image.

At S107, the processor compares the depth data that is associated with the location to depth data of surrounding points to define a focus area. In addition, the comparison may utilize both the depth data and the position data. For example, the comparison may define the focus area to be all points within a predetermined distance measured in all directions from the location. The focus area is defined by a function. The function may be a discrete comparison, which means that the focus area includes points surrounding the user selected location that have depth data within a predetermined distance from the depth data of the user selected location. Alternatively, the function may be dependent on the rate of change of the depth data of the surrounding pixels. In other words, the function examines a rate of change of the depth data in a direction moving away from the user selected location to define the focus area where the rate of change is less than a predetermined rate.

At S109, the processor alters the panoramic image with a graphical effect that indicates at least one of the surrounding points. The graphical effect may adjust pixel values in the focus area to change one or more of the brightness, intensity, or color of the focus area. The graphical effect may be an outline around the focus area or a blur effect. The graphical effect may be flood fill, which converts all of the pixels in the focus area to the same color (e.g., all black, all white). The graphical effect may remove pixels in the focus area. Alternatively, the graphical effect may change the appearance of pixels in the panoramic image outside of the focus area and still indicate at least one of the surrounding points. For example, a map navigation route path can be used to highlight a path and nearby objects in the camera color image. Pixels may be classified based on depth. Pixels that are above the path or within a specified radius of the path may be emphasized.

The embodiments described above may be combined with systems and methods for illustrating routes in panoramic or other images as described in copending application "THREE DIMENSIONAL ROUTING" by James D. Lynch, filed Oct. 21, 2011 Ser. No. 13/278,546, which is incorporated by reference in its entirety. The embodiments described above may also be combined with the systems and method for illustrating depth in a panoramic image or other images as described in copending application "DEPTH CURSOR AND DEPTH MEASUREMENT IN IMAGES" By James D. Lynch, filed Oct. 21, 2011 Ser. No. 13/278,512, which in incorporated by reference in its entirety.

The embodiments described above may be implemented using computer executable instructions stored in the memory 501 and/or the memory 601, which are non-transitory. The processors may execute computer executable instructions. The computer executable instructions may be written in any computer language, such as C++, C#, Java, Pascal, Visual Basic, Perl, HyperText Markup Language (HTML), JavaScript, assembly language, extensible markup language (XML), graphics languages such as WebGL and OpenGL, and shading languages such as OpenGL Shading Language (GLSL) and High Level Shading Language (HLSL), and any combination thereof.

The computer executable instructions may be logic encoded in one or more tangible media or one or more non-transitory tangible media for execution by the processors. Logic encoded in one or more tangible media for execution may be defined as instructions that are executable by the processors and that are provided on the computer-readable storage media, memories, or a combination thereof. Instructions for instructing a network device may be stored on any logic. As used herein, "logic", includes but is not limited to hardware, firmware, software in execution on a machine, and/or combinations of each to perform a function(s) or an action(s), and/or to cause a function or action from another logic, method, and/or system. Logic may include, for example, a software controlled microprocessor, an ASIC, an analog circuit, a digital circuit, a programmed logic device, and a memory device containing instructions.

The computer readable instructions may be stored on any non-transitory computer readable medium. A non-transitory computer readable medium may include, but are not limited to, a floppy disk, a hard disk, an ASIC, a compact disk, other optical medium, a random access memory (RAM), a read only memory (ROM), a memory chip or card, a memory stick, and other media from which a computer, a processor or other electronic device can read.

As used herein, the phrases "in communication" and "couple" are defined to mean directly connected to or indirectly connected through one or more intermediate components. Such intermediate components may include both hardware and software based components.

Various embodiments described herein can be used alone or in combination with one another. The foregoing detailed description has described only a few of the many possible implementations of the present invention. It is intended that the foregoing detailed description be regarded as illustrative rather than limiting and that it is understood that the following claims including all equivalents are intended to define the scope of the invention.

I claim:

1. A method for reimaging objects in a panoramic image, the method comprising:
   receiving a depthmap generated from an optical distancing system, wherein the depthmap includes depth data for each of a plurality of points;
   overlaying the depthmap on the panoramic image according to the plurality of points;
   receiving data indicative of a location on the panoramic image and indicative of a first point of the plurality of points;
   comparing depth data of the first point to depth data of surrounding points through the calculation of a difference between the depth data of each of the surrounding points and the depth data of the first point to determine a gradient quantity;
   comparing the gradient quantity to a predetermined value;
   identifying surrounding points for which the predetermined value exceeds the gradient quantity as an area on the panoramic image corresponding to a subset of the surrounding points; and
   altering the panoramic image with a graphical effect at one or more of the surrounding points.

2. The method of claim 1, wherein each of the plurality of points comprises two-dimensional position data.

3. The method of claim 1, wherein the graphical effect blurs portions of the panoramic image, inverts portions of the panoramic image, outlines portions of the panoramic image, obscures portions of the panoramic image, fades portions of the panoramic image, cuts pixels from portions of the panoramic image, or removes portions of the panoramic image.

4. The method of claim 1, wherein receiving data indicative of a location on the panoramic image comprises receiving a user input of the location on the panoramic image.

5. The method of claim 1, wherein receiving data indicative of a location on the panoramic image comprises receiving a map object associated with a route, a point of interest, a destination, or a cue.

6. The method of claim 1, wherein the optical distancing system is a light detection and ranging (LIDAR) system.

7. The method of claim 1, wherein the optical distancing system is a two dimensional stereo camera that collects the panoramic image and the depthmap.

8. The method of claim 1, wherein the graphical effect is a simulated spotlight, wherein an intensity of each of the surrounding points is a function of a the depth data of the surrounding points and position data associated with the surrounding points.

9. The method of claim 1, wherein the optical distancing system emits structured infrared light.

10. An apparatus for reimaging objects in an image, the apparatus comprising:
  a memory configured to store a depthmap overlaid on the image, wherein the depthmap is generated from an optical distancing system and includes depth data for each of plurality of points; and
  a processor configured to receive a location on the image and configured to identify a focus area on the image corresponding to the location, wherein the focus area is defined according to a function of depth data of the location and depth data of points surrounding the location, wherein the image is altered with a graphical effect at the focus area,
  wherein the function uses a rate of change of the depth data in a direction moving away from the location to define the focus area where the rate of change is less than a predetermined rate.

11. The apparatus of claim 10, wherein the graphical effect is an outline of a physical object, a blurring of the focus area, a color inversion of the focus area, a fading of the focus area, or a fading of the image outside of the focus area.

12. The apparatus of claim 10, wherein the optical distancing system is a light detection and ranging (LIDAR) system.

13. The apparatus of claim 10, wherein the location is based on a perspective that defines the image.

14. The apparatus of claim 10, wherein the function defines the focus area to include points surrounding the location that have depth data within a predetermined distance from the depth data of the location.

15. A non-transitory computer readable medium configured to store a computer program configured to organize spatial data, the program comprising instructions to:
  receive a depthmap generated from an optical distancing system, wherein the depthmap includes depth data for each of a plurality of points and is overlaid on an image according to the plurality of points;
  receive data indicative of a location on the image and a first point of the plurality of points; and
  alter pixel values in the image at a subset of the surrounding points according to a function of the depth data,
  wherein the function uses a rate of change of the depth data in a direction moving away from the first point to define the subset of surrounding points where the rate of change is less than a predetermined rate.

16. The non-transitory computer readable medium of claim 15, wherein the function defines the subset of the surrounding points to include points surrounding the location that have depth data within a predetermined distance from the depth data of the first point.

17. The non-transitory computer readable medium of claim 15, wherein the optical distancing system is a light detection and ranging (LIDAR) system.

18. A method comprising:
  receiving a depthmap generated from an optical distancing system, wherein the depthmap includes depth data for each of a plurality of points;
  associating the depthmap on a panoramic image according to the plurality of points;
  receiving data indicative of a location on the panoramic image and indicative of a first point of the plurality of points;
  calculating a difference between a depth of the first point and depths of surrounding points;
  comparing the differences between the depth of the first point and the depths of surrounding points to a threshold value;
  identifying a subset of surrounding points for which the threshold value exceeds the differences between the depth of the first point and the depths of surrounding points; and
  altering the panoramic image with a graphical effect at the subset of surrounding points.

19. The method of claim 18, wherein the difference between the depth of the first point and depths of surrounding points is a gradient quantity.

20. The method of claim 18, wherein the graphical effect highlights an object corresponding to the subset of surrounding points.

* * * * *

UNITED STATES PATENT AND TRADEMARK OFFICE
CERTIFICATE OF CORRECTION

PATENT NO. : 8,553,942 B2  Page 1 of 1
APPLICATION NO. : 13/278499
DATED : October 8, 2013
INVENTOR(S) : James D. Lynch It is certified that error appears in the above-identified patent and that said Letters Patent is hereby corrected as shown below:

In the claims:
Column 16
claim 15 line 10, please delete "the" before surrounding.

Signed and Sealed this
Third Day of December, 2013

Margaret A. Focarino
*Commissioner for Patents of the United States Patent and Trademark Office*